Jan. 28, 1936.  C. W. BARTON  2,028,751
CONTAINER
Filed April 6, 1933   3 Sheets-Sheet 1
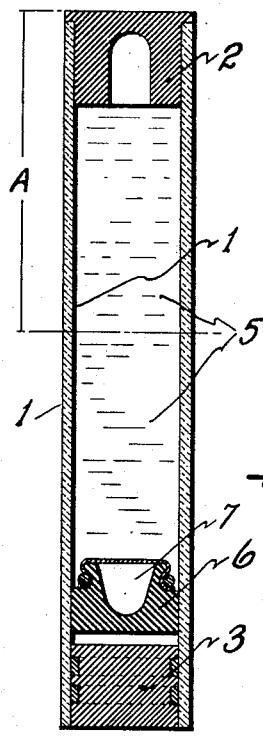
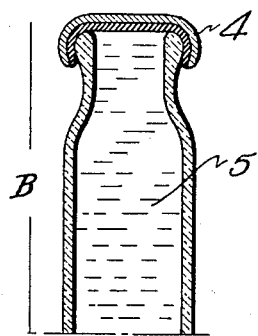
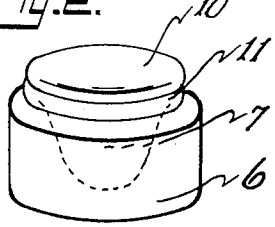
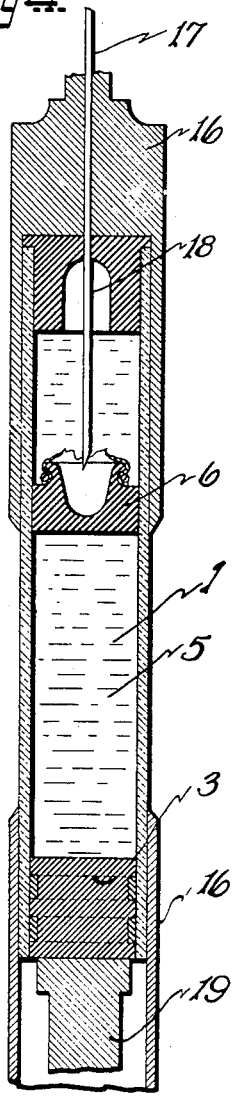
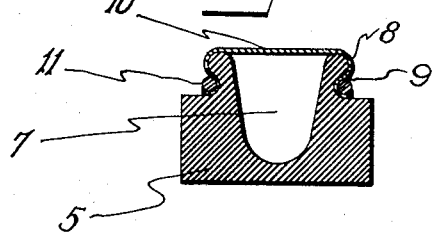
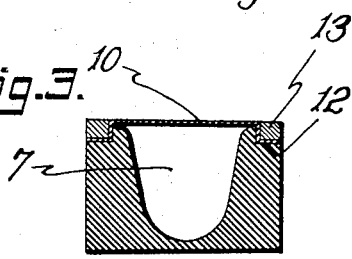
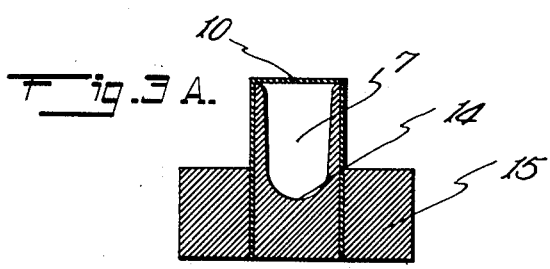
Charles W. Barton
INVENTOR
BY Crichton Clarke
ATTORNEY Jan. 28, 1936.　　　C. W. BARTON　　　2,028,751
CONTAINER
Filed April 6, 1933　　　3 Sheets-Sheet 2
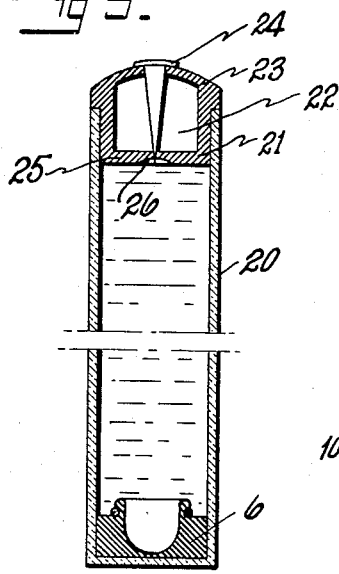
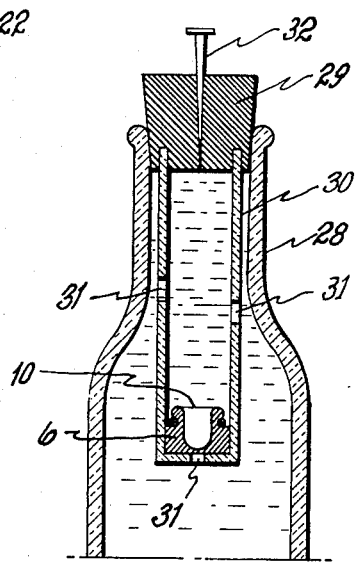
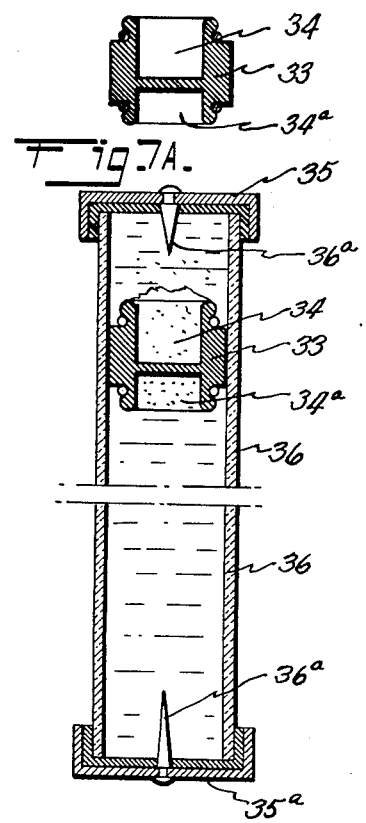
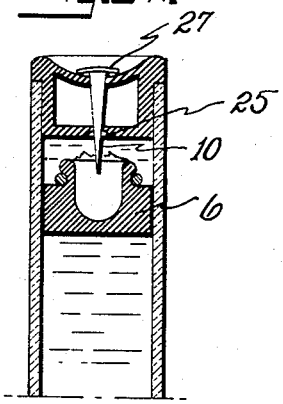
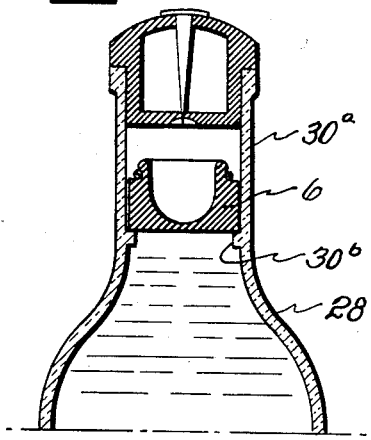
Charles W. Barton
INVENTOR
BY Crichton Clarke
ATTORNEY Jan. 28, 1936.　　　　C. W. BARTON　　　2,028,751
CONTAINER
Filed April 6, 1933　　　3 Sheets-Sheet 3
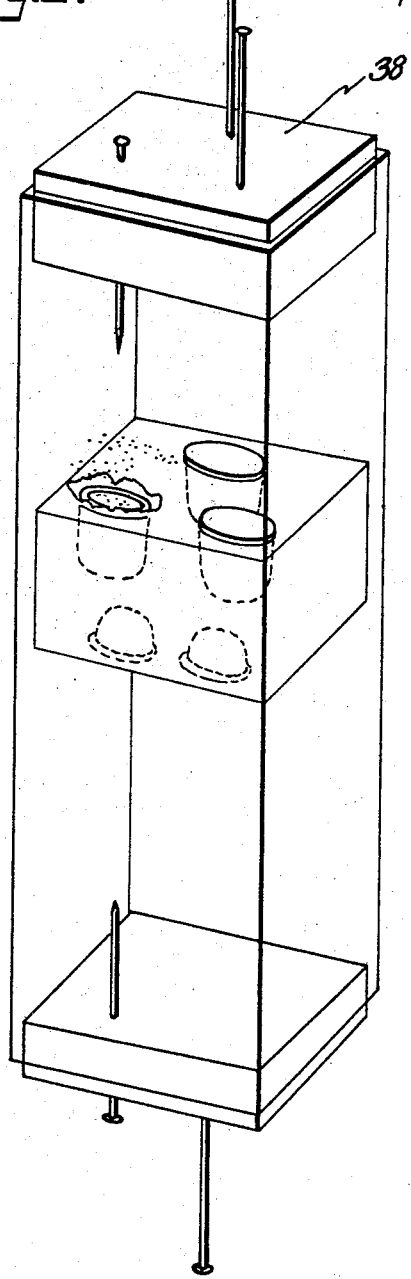
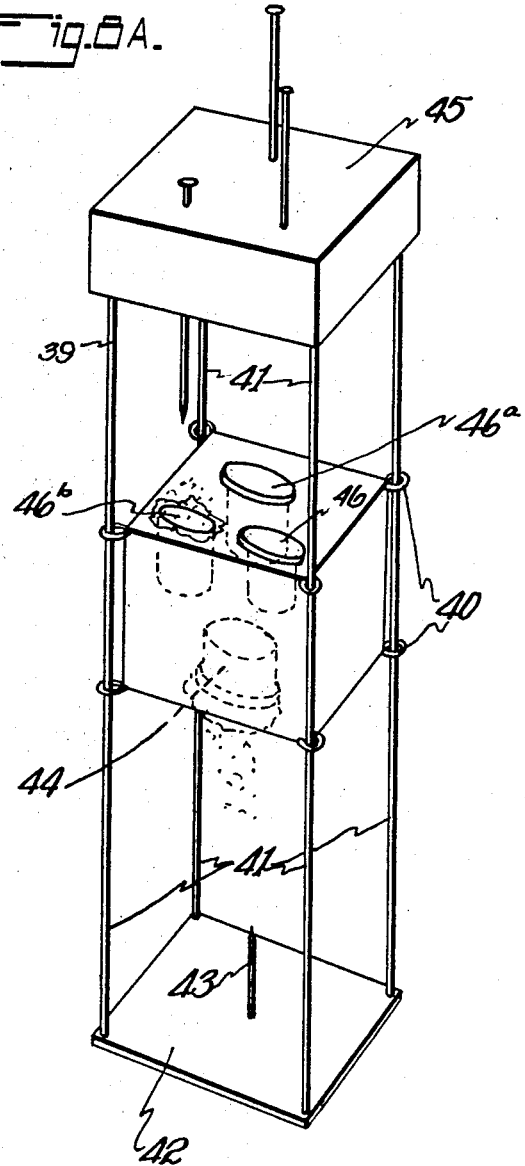
Charles W. Barton
INVENTOR
BY Crichton Clarke
ATTORNEY Patented Jan. 28, 1936

2,028,751

UNITED STATES PATENT OFFICE 2,028,751

CONTAINER

Charles W. Barton, New York, N. Y.

Application April 6, 1933, Serial No. 664,816

2 Claims. (Cl. 128—272)

It is well known that many chemical substances are not stable in solution under ordinary storage conditions. These substances, in solution, gradually either decompose or undergo intramolecular rearrangements, or other changes of physical or chemical nature and for this reason become useless for the purpose which they are intended to serve. Nor is it possible in all cases to stabilize these substances in a solution by the addition of a suitable stabilizing ingredient, since such an ingredient may make the solution unfit for its intended use.

Also, where certain ingredients already form a solution or emulsion, but have to or may be supplemented by one or more other ingredients before use in order to fully serve their purpose, such additions can be made solely immediately before use, if on more or less prolonged standing of the supplemented solution or emulsion they would cause a change in the physical or chemical constitution of the same.

In the above mentioned cases it is, therefore, on account of the unstability of the solutions or emulsions, necessary to prepare the solutions or emulsions from their ingredients shortly before use.

As far as the preparation of a solution or of a supplemented solution or emulsion of the above discussed nature, shortly before use, is concerned, it is known to everybody familiar with the preparation of such solutions or emulsions that there are many instances where the requirements of practical work are such as to render it very convenient or even necessary to have at one's disposal sealed containers which enclose the ingredients of which the solutions or emulsions are intended to consist, in the proper proportions and ready for easy and quick mixture and immediate use.

The present invention is concerned with means by which these requirements of practice are met in an exceedingly convenient, efficient and trustworthy manner.

Quite generally, my invention is concerned with a container of any kind and shape suitable or customary for the confinement therein of solutions or emulsions to be marketed, and which container has at least one opening to be closed by a closure, such as a stopper, or screw cap or any stoppering device or seal consisting of rubber, a rubber composition, cork or cork composition, sheet metal, or any other suitable or customary material. Within the body of such container at least two chambers or compartments are provided.

One of these chambers is formed by the space in the interior of the body of the container when the closure is inserted into the opening of the container.

Another chamber may be provided within the above described first chamber, as follows:

A pellet-like body or float is put into the above described chamber formed by the body of the container, which float has an axial recess, for instance in the form of a cup. The opening of the recess can be tightly closed by means of a thin closure, such as a membrane. In this manner a hermetically sealed chamber is formed within the pellet-like float.

These chambers or compartments formed in the particular manner as above described represent the means through which my invention can be put into practice. For the preparation of a solution, or of a supplemented solution or emulsion as above referred to, each one of the chambers may be filled with one of the ingredients from which the emulsions or solutions are to be prepared. Then, by destroying the thin closure which closes the mouth of the cup-like recess in the pellet, mixture of the ingredients can easily be performed within the sealed container and thus a fresh preparation be obtained shortly before use thereof.

The applications to which my invention may be put are numerous and diversified. In the following, I shall give a few examples which will serve to illustrate the invention in its application to certain definite objects, as well as to leave no doubt that the invention is not limited to these particular examples, but extends to every field where the problem of preparing solutions or emulsions and/or making additions thereto, shortly before use, arises, and where the general means, described above for serving that purpose, can be adapted for use.

Certain buffered local anesthetic or other medicament solutions, such as, for instance, buffered aqueous procainepinephrin solutions, are not stable over a prolonged time; this property makes it inadvisable to market such solutions ready for use in cartridges or medicament containers for hypodermical injections, because no guarantee can be given that the composition of the solutions when they reach the physician or dentist is identical with that of the original solutions, on account of chemical or physical changes of the drug. Thus, up to the present time, the only means for a physician or dentist for ensuring the efficiency and integrity of such buffered solutions has been the preparation thereof from tablets shortly before each injection, or the addition of the buffer salts to the already prepared anesthetic solution. This is, of course, a rather cumbersome and uncertain method, since in each single case the utmost care must be taken by the physician or dentist to attain and preserve a thorough sterilization of the solutions, as well as to ensure accurate dosage and isotonicity of the ingredients. Under these circumstances, it has been a problem for a long time to supply the medical and dental professions with a cartridge or sealed medicament container which would permit the preparation of a buffered local anesthetic or other medicament solution within said cartridge or container shortly before the use of such solution without opening the container, which is thus fresh and sterile, for a hypodermical injection.

In the accompanying drawings, a cartridge or sealed medicament container is shown by way of example in order to illustrate the characteristic features of the present invention.

Figs. 1 and 1a are longitudinal sections of a cartridge and its upper portion, respectively.

Figs. 2 and 2a are a perspective view and a cross-section of the pellet.

Figs. 3 and 3a show modifications of the same pellet.

Fig. 4 shows the cartridge in longitudinal section, inserted in a hypodermic syringe.

In Figs. 5 to 7a slightly modified forms of the cartridge and pellet are illustrated, while Figs. 8 and 8a exhibit arrangements of multiple pellets.

In Fig. 1, the cartridge shown comprises a tubular glass body 1, which is sealed at its opposite ends by rubber plugs or stoppers 2 and 3, respectively. A cartridge of this type is described and claimed in U. S. P. 1,715,771. Part A of the cartridge in Fig. 1 may be replaced by part B as shown in Fig. 1a. Part B is characterized by having a seal or closure different from stopper 2 of part A. Instead of using the diaphragm stopper 2 as closure for the opening as in part A, one may slip over said opening a cap the general appearance of which is illustrated in longitudinal section by Fig. 1a, wherein 4 is said cap. Concerning the details of this cap, reference is made to U. S. P. 1,843,554.

Referring to the above described chambers or compartments, within the container, the space between the inner end of the stopper 2 and the inner end of stopper 3, or the cap 4, respectively, in Fig. 1, forms one chamber 5.

Within this tubular chamber 5, a pellet 6 is provided, which can freely slide up and down in the tubular chamber 5. The pellet has an axial cup-like recess 7. The mouth of the recess is closed by a thin membrane, whereby another sealed chamber is obtained within the container. For the sake of clarity, the pellet 6 in Fig. 1 is shown somewhat removed from the stopper 3, although it would normally rest on top of the inner plane surface of said stopper in the upright position of the cartridge as shown in Fig. 1.

Details of said pellet are shown in Figs. 2 and 2a. Fig. 2 is a perspective view of said pellet, while Fig. 2a represents a cross section thereof.

The pellet 6 may be made of a metal such as brass, tin, or of any other suitable material, or it may be fashioned of metal and covered with celluloid, bakelite, or heavily lacquered. It is provided with a cup 7, the opening of which is shaped in the form of a bulging lip 8 which is perfectly rounded. The lip 8 is provided with an undercut 9, deep enough to permit a wire, cord, band or similar fastening of appropriate thickness to rest in it. A thin membrane 10 is tightly stretched across the mouth of the cup and held in position by the fastening 11.

A modification of the pellet 6 is shown in Fig. 3. Instead of being provided with a lip as in Figs. 2 and 2a, the pellet is provided at the opening of the cup 7 with a shoulder 12. Into the shoulder 12 fits a ring 13 which firmly holds the membrane 10 when it has been stretched over the opening of the cup 7.

Another modification of the pellet 6 is shown in Fig. 3a. The cylindrical core 14 is provided with a cup 7. The membrane 10 covers the core 14 and is held firmly in position by the ring 15.

For the purpose of preparing a fresh, buffered anesthetic solution shortly before use thereof, the cup 7 in any of the above described pellets may be filled with a buffer charge, and the chamber 5 with an anesthetic solution. Before an injection, the cartridge is inserted into a hypodermic syringe, for instance such as shown in U. S. Patent 1,715,771, above referred to. Fig. 4 illustrates the working of a cartridge when it has been inserted into the hypodermic syringe. The syringe includes a cartridge holder or barrel 16; a hypodermic needle 17 having associated therewith the cartridge-piercing canula 18, and a plunger rod 19 for expelling the contents of the container through the canula 18 by means of the solid movable plug 3 in the glass tube 1. By a throwing movement of the syringe, the pellet is thrust against the needle protruding into the cartridge, whereby the thin membrane closing the mouth of the pellet bursts open. The buffer charge in the cup is thus liberated and dissolves in the anesthetic solution. The freshly prepared and sterile buffered solution is then ready for injection.

My invention is not limited to the cartridge type of container. Fig. 5 shows the adaptation of the pellet-like float to an ordinary cylindrical container. The pellet 6 fits the container 20 which is closed by a specially constructed stopper 21. This stopper, made of soft rubber, hermetically seals the container; it is provided with a hollow space 22, and into its upper wall 23 is firmly fixed a suitable pin 24, the point of which is imbedded in the opposite rubber wall 25 of the stopper at 26. This arrangement is made in order to prevent the membrane from coming in contact with the pin point during transportation or storage of the container. In Fig. 5a is shown the method of operating the device. Finger pressure is applied on the top of the stopper at 27; thereby the needle point is pushed through the lower wall 25 of the stopper exposing the needle point. The container is then turned over, or an appropriate shaking motion is made with the container in order to thrust the pellet with its membrane side against the pin point. The membrane 10 bursts open, and the charge contained in the cup of the pellet is liberated for mixing with the charge in the chamber of the container.

A further variation of my inventive idea is illustrated by Figs. 6 and 6a. It comprises the adaptation of the pellet 6 to any kind of stopper in any kind of container.

In Fig. 6, the bottle 28 is closed by an ordinary bottle stopper 29 made of cork or any other suitable material such as rubber or rubber composition. Into the stopper is fastened a cylinder 30 made of metal, glass, bakelite or any other suitable material. This cylinder has openings at 31 in order to permit the liquid in the bottle to flow freely into it. These openings, of course, must be smaller than the height of the pellet 6 resting at the bottom of the cylinder. The pellet can slide freely up and down in the cylinder. In the stopper 29 is provided an ordinary needle 32 with a round head. The needle is not pushed entirely through the stopper. At the time of use the needle is pushed entirely through the stopper 29, whereby its point is exposed. When the bottle is then turned upside down, or an appropriate shaking movement is made with it, the pellet is thrust against the pin point, whereby the membrane 10 bursts open, and the charge is liberated.

Or, in Fig. 6a, the bottle 28 is provided with a cylindrical neck 30a. At the lower end of the cylindrical neck is a shoulder 30b upon which the pellet 6 rests. The bottle may be closed hermetically with any one of the closures described above for the bottle in Fig. 6, but preferably with a stopper of the kind described for the container 20 in Fig. 5. The operation of the device in Fig. 6a is apparent from that of the devices in Fig. 6 or in Figs. 5 and 5a.

The above devices illustrating my invention are provided with only two chambers.

In order to provide three separate chambers or compartments within a container, a modification of the pellet may be made, as shown in Fig. 7 in longitudinal section. The tubular body of the pellet 33 is provided with two cup-like recesses 34 and 34a, the details of which as to closure are identical wtih those of the pellet 6 shown in Figs. 2 and 2a.

When this double-cup pellet is used in the cartridge as shown in Fig. 4, in order to open up the membrane of cup 34a, and thus to effect mixture of the charge in said cup with the other ingredients, the rubber plug 3 in Figs. 1 and 4 may be punched with a sterilized pin or bodkin and then the pellet thrust against the point of said pin or bodkin by a throwing movement of the syringe. The cup 34 is then opened up as shown for the cup 7 in Fig. 4.

The double-cup pellet may also be used with an ordinary cylindrical container 36, open at both ends. Fig. 7a shows an example of such container which may serve for making, for instance, photographic developer solutions in which it is necessary to dissolve two chemicals, one after the other. In the double-cup pellet 33, one chemical is placed in recess 34 and the other chemical in recess 34a, both recesses being hermetically sealed by a thin perforable membrane. One of the special closures 35 and 35a consisting of a bakelite, celluloid, metal or other suitable cap 35b provided with a pin 36a in its center, and a soft-rubber washer 37 to ensure a leak-proof seal is fitted to one end of the cylindrical container 36, which is then stood on its end. The required amount of water or other necessary solvent is then poured into the container and the double-cup pellet 33 dropped into the solvent, with cup 34a pointing downward. After the second closure has been placed over the other opening of the container, first one chemical and then the other chemical may be liberated from their chambers by piercing the membranes, one after the other, by thrusting the pellet against the respective pins.

The cylindrical container of Fig. 7a may also be closed by ordinary closures, such as shown in Figs. 6 and 6a, and made of cork, rubber, or other perforable material, and an ordinary needle may be passed through the seals as in Figs. 6 and 6a, or a closure such as shown in Figs. 5 and 5a may be used on either end of the container 36. In place of these closures, a special cap, if desired a screw cap, may be fitted, made of metal, bakelite, bone, celluloid or any other suitable material, lined with soft rubber to ensure a leak-proof seal of the container and provided with a pin projecting from the center of the cover into the container.

The floating pellet, thus far described, may also be fashioned so as to freely slide up and down in a container of square, triangular or oval shape. It may be provided with any desired number of recesses, either on one or on both surfaces facing the opening or openings of the container; in this case, the cover or covers of the container are provided with the sufficient number of pins in accordance with the devices of Figs. 8 and 8a and in an arrangement to conform to the location of the recesses in the pellet.

Fig. 8 shows an example of a square container and a square floating pellet with five chambers. In the covers 38 and 38a of the container the pins are so arranged that each one of them faces one of the membranes. By exposing one pin after the other in a prescribed sequence, and by thus piercing one membrane after the other and liberating and dissolving one chemical after the other in the solvent enclosed in the container, a mixed solution of five different chemicals in a solvent can be made freshly before the container is opened.

Instead of using this multiple-cup pellet, which floats freely in the square container, the pellet may be mounted, as shown in Fig. 8a, on a frame work 39 made of metal, bakelite, celluloid, glass or other suitable material and fastened to it by the rings 40 so that it will freely slide up and down between the rails 41. In Fig. 8a the modification is illustrated with a four-cup pellet. In the bottom plate 42 of the frame work, a thorn 43 is provided which will pierce the membrane that seals cup 44, while in the cork closure 45 the necessary number of pins is arranged in the required positions relative to the membranes 46, 46a and 46b. This frame work may be placed in a wide-mouth container of any kind by fastening it onto the closure 45. The operation of this device is then the same as that of the container illustrated in Fig. 8.

I claim:

1. In a device of the character described, an outer elongated container having one end open, an inner container slidable longitudinally in said outer container and guided and held in axial alinement by the inner walls thereof and having a compartment therein sealed by a thin puncturable wall, means for closing the open end of said outer container, and means operative upon the movement of inner container for puncturing said thin wall of the sealed compartment therein.

2. In a device of the character described, an outer elongated container, an inner container slidable longitudinally in said outer container and guided in axial alinement by the inner walls thereof, said inner container having a compartment sealed by a drumhead puncturable diaphragm, a closure for the outer compartment and means operative upon the longitudinal movement of the inner container for puncturing said diaphragm.

CHARLES W. BARTON.